July 14, 1936.   E. H. DELLING ET AL   2,047,672
APPARATUS FOR DISTRIBUTING LUBRICANT TO STEAM ENGINES
Filed Oct. 17, 1935
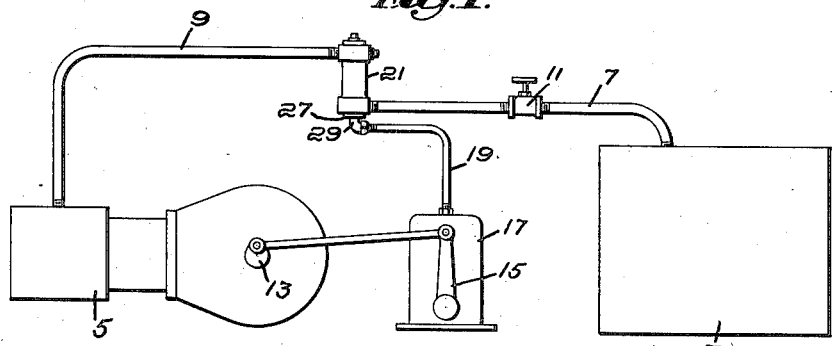
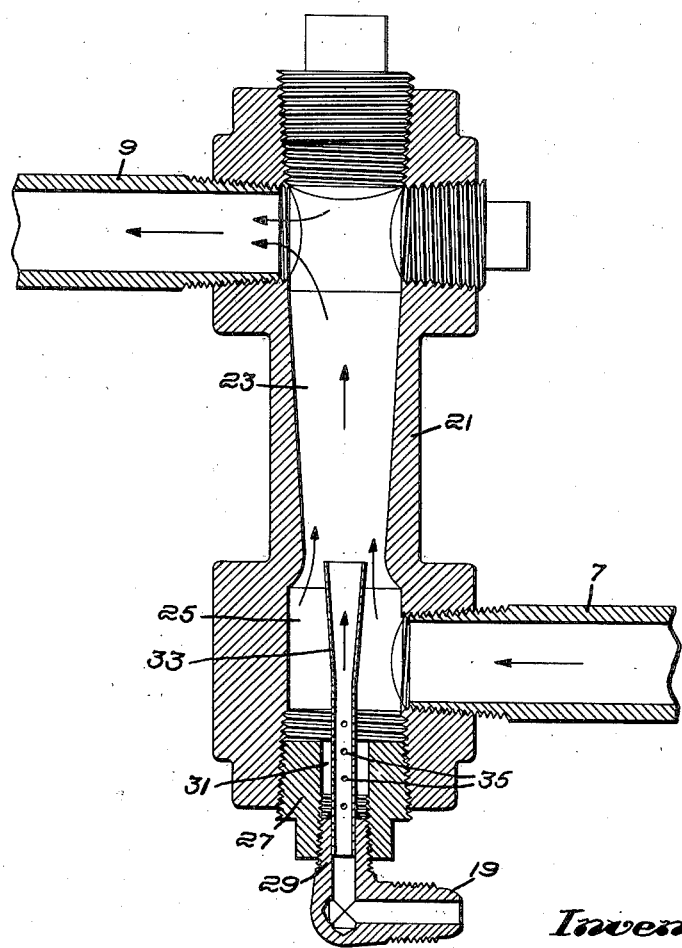
Inventors:
Erik H. Delling,
William Lamken,
By Emery Booth Townsend Miller & Weidner
Attys Patented July 14, 1936

2,047,672

UNITED STATES PATENT OFFICE 2,047,672

APPARATUS FOR DISTRIBUTING LUBRICANT TO STEAM ENGINES

Erik H. Delling, Boston, Mass., and William Lamken, Buffalo, N. Y., assignors to Steam Motors, Inc., Boston, Mass., a corporation of Massachusetts Application October 17, 1935, Serial No. 45,382

6 Claims. (Cl. 184—55)

This invention relates to apparatus for distributing lubricant to steam engines, and more particularly to those conditions where a small amount of lubricant, such as oil, is periodically introduced into the steam passage between the boiler and the engine. It has particular application to conditions under which the engine is intermittently operated, as in the case of a steam power vehicle where there are intervals due to coasting on a down grade or otherwise when the throttle is closed but while the lubricating supply agency is still operative.

Where high temperature conditions prevail through the use of high pressure steam, the continued introduction of lubricant into the steam passage, even in minute quantities, as heretofore practiced allows the lubricant to accumulate and spread over the highly heated steam pipes when the throttle is closed and there is no flow of steam. It has been usual heretofore to deliver the oil drop by drop directly in the path of the steam to be atomized and carried over thereby into the engine. With the throttle closed and no steam flowing, this oil drops and accumulates on the walls of the steam pipes, leaving it in a position where the steam is ineffective to carry it over. This in turn leaves the engine for a substantial period after the throttle is opened devoid of any lubricant, resulting in wear and a scoring of the valves and other parts of the engine. Furthermore the oil thus accumulated on the heated steam pipes carbonizes and, in the course of time, tends to choke the steam passage.

The present invention has among other objects the introduction of lubricant (herein referred to generically as oil) in such manner that when the throttle is closed, the lubricant and any subsequent accession therein collects in a reservoir or trap out of the direct line of the steam and away from the highly heated surfaces, in which trap it accumulates and from which it is withdrawn and atomized by the action of the steam and carried over into the engine as soon as the throttle is again opened.

In the drawing:

Fig. 1 is a more or less diagrammatic view in elevation showing the general relation of the oil distributor to the boiler, throttle, engine and oil supply device; and Fig. 2 is a cross-sectional elevation taken through the distributing device.

Referring to the drawing and to the embodiment of the invention selected for illustration, Fig. 1 shows diagrammatically the principal parts of a power plant for a road vehicle comprising the boiler 3, the engine 5, connecting steam pipes 7 and 9, and throttle 11, the crank shaft of the engine in this case being assumed to be connected to the driving wheels of a road vehicle, so that, so long as the vehicle is moving, the engine shaft is turning. Connected to be driven from the engine by an eccentric 13 and ratchet drive 15 is an oil pump 17 adapted to introduce periodically through the pipe 19 a small quantity of oil into the connecting steam passages between the boiler and the engine. Such quantity may be minute, such (by way of illustration only) as seven or eight drops for each mile traveled by the vehicle.

The oil, instead of being discharged directly into the hot steam pipe, is conveyed into the bottom of a distributing device 21 from which it is withdrawn in an atomized state by the action of the steam passing over the mouth of a Venturi tube.

Referring to Fig. 2, the distributing device 21 comprises an upright casing having an internal upright passage 23 with upwardly and outwardly tapered walls, the upper part of which is connected to the pipe 9 leading to the engine. The lower or restricted part of the passage opens into a somewhat enlarged steam chamber 25 into which the steam pipe 7 leading from the boiler opens above the bottom of the chamber. The chamber 25 extends below the level of the entrance of the steam pipe 7 and is closed by the threaded plug 27. The latter has a central bore forming an oil passage, the bottom of which is threaded to receive a pipe fitting 29 for the oil pipe 19, leaving, however, the upper part 31 of the passage opening into the chamber 25, together with the oil passage itself, to serve as a trap or well for the accumulation of oil arising either through successive additions from the lubricating pump or through drainage from the chamber 25 or the Venturi tube 33.

To cause the steam to take up the oil in atomized form and carry it over to the engine when the throttle is opened, the upright Venturi tube 33 is mounted in the connection 29 forming an extension of the oil feed passage from the pipe 19 and connection 29. The Venturi tube extends upward through the well 31, leaving therein an annular space around the exterior thereof and thence upward through the chamber 25 having its flared mouth extending into the lower contracted portion of the steam passage 23. The lower part of the Venturi tube, and particularly the part extending through the well 31, has its walls provided with perforations 35 so that any oil accumulating in the well may pass freely into the tube and is subject to the suction created by the steam passing over the mouth of the Venturi tube.

In the normal operation of the device when the throttle is open, the passage of steam over the mouth of the venturi draws up small minute quantities of oil on the inside of the venturi from the oil feed passage, and such oil as reaches the lip of the Venturi tube is atomized and carried over with the steam into the engine.

Should the throttle be closed to permit the vehicle to coast, any oil left in the venturi will gravitate to the bottom of the tube, and such oil as continues to be fed by the pump will accumulate in the oil passage and ultimately, if that condition persists long enough, will pass into the bottom of the well 31 where it is out of line of the direct passage of the steam and sufficiently removed from the highly heated surfaces as to suffer no impairment by carbonization or otherwise.

As soon as the throttle is again opened, however, the rush of steam over the mouth of the venturi will create a suction therein and cause any oil in that part of the well surrounding the Venturi tube to pass into the tube through the perforations, whence it flows out the inside of the venturi to mingle with the steam, an accumulated supply of oil being always available for lubrication as soon as the throttle is opened. In actual use the periods during which the throttle is closed and the engine running will ordinarily be such that the continued feed of oil to the distributing device will never fill the well or seldom cause the oil to rise much above the lower perforation in the Venturi tube.

It will be seen that the oil is held in reserve out of the direct line of high temperature steam and out of contact with the surfaces over which such steam flows, but is withdrawn from such reserve by the steam passing over the mouth of the venturi at a substantial distance from the oil reservoir.

While we have herein shown and described for the purposes of illustration one specific embodiment of the invention, it is to be understood that extensive deviations may be made from the form, construction and relative arrangement of parts, all without departing from the spirit of the invention.

We claim:

1. The combination with a boiler, an engine and a steam line connecting the two, of a throttle in the steam line, a lubricant distributing device interposed in the steam line between the throttle and the engine, the same comprising a casing having a chamber in its lower part into which the steam line from the boiler enters laterally, an upright steam passage communicating with said chamber through a restricted mouth, the walls of said passage being flared upwardly and outwardly and having communication near the top thereof with the steam line to the engine, a well in the bottom of said chamber, a lubricant supply conduit connected to the bottom of the casing, a Venturi tube communicating with said lubricant supply conduit and extending upwardly through said well and said chamber and having an enlarged mouth in cooperative relation to the restricted mouth of the upright passage, the interior of said Venturi tube communicating with said well, and means connected to the engine for supplying lubricant to said casing through said conduit.

2. The combination with a boiler, an engine and a steam line connecting the two, of a throttle in the steam line, a casing interposed in the steam line between the throttle and the engine, said casing having a chamber and the steam line from the boiler opening into said chamber at the side thereof, a lubricant supply conduit entering the bottom of said casing, a Venturi tube having its mouth in said chamber in line with the passage of steam from said steam pipe and its bottom communicating with the passage of said lubricant supply conduit, said casing having a lubricant receiving well at the bottom of said chamber surrounding the lower part of the venturi and communicating with the interior of the latter through openings in the walls thereof, and means operated by the engine for delivering lubricant to the casing through the oil conduit.

3. The combination with a boiler, an engine and a steam line connecting the two, of a throttle in the steam line, a lubricant distributor having a well removed from the direct passage of the steam adapted to hold lubricant in non-carbonizing relation to the heated steam contacting surfaces and to receive lubricant therein when the steam is shut off, means for delivering lubricant to said well, and means extending into the steam passage from said well to deliver lubricant in atomized form to the steam when the throttle is opened.

4. The combination with a boiler, an engine and a steam line connecting the two, of a throttle in the steam line, a lubricant distributing device between the throttle and the engine having a chamber into which the steam line from the boiler enters, a lubricant receiving well below said chamber and out of line with the direct passage of steam from the boiler, a Venturi tube having one end in communication with said well and its mouth in said chamber in the direct steam line, and means for delivering lubricant to said well.

5. The combination with a boiler, an engine and steam line connecting the two, of a throttle in the steam line, a lubricant distributing device between the throttle and the engine comprising a lubricant receiving well out of the line with the direct passage of steam from the boiler, a Venturi tube having its interior communicating with said well and its mouth in the direct steam line, and means for delivering lubricant to said well.

6. The combination with a steam road vehicle engine, of a boiler therefor, a steam line connecting the two, a throttle valve for the steam line, means for lubricating the engine comprising a lubricant reservoir maintained out of direct line of the steam passage and out of lubricant carbonizing relation to the surfaces of the steam pipes, means for continuously delivering lubricant to the reservoir during periods when the throttle is closed and the flow of steam is shut off, and means for causing withdrawal of lubricant from the reservoir into the steam line when the throttle is opened and flow of steam resumed.

ERIK H. DELLING.
WILLIAM LAMKEN.